Nov. 8, 1955
C. L. CUMMINGS
2,722,845
CHANGE SPEED MECHANISM FOR INSTRUMENT DRIVES
Filed Nov. 12, 1953
2 Sheets-Sheet 1
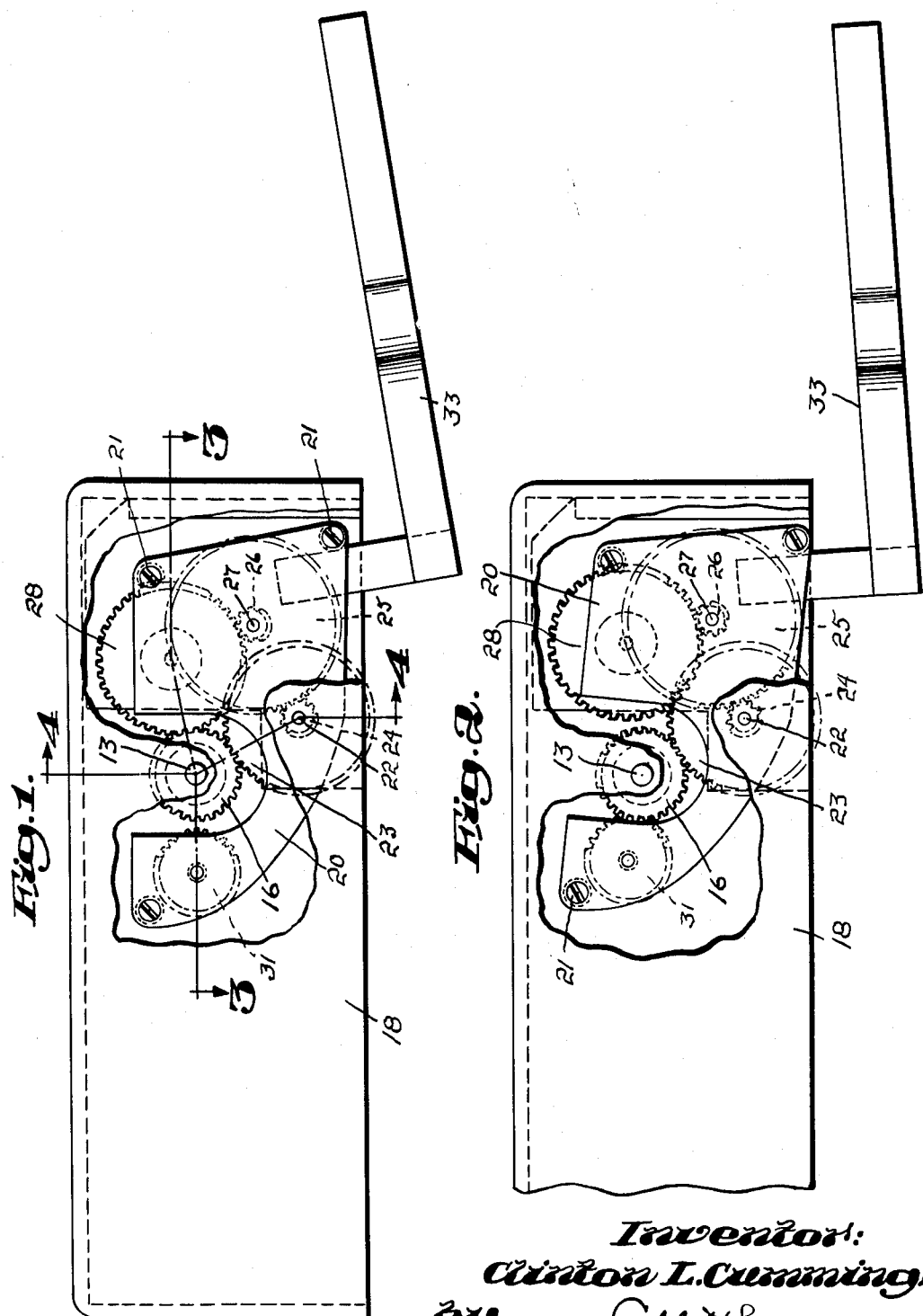
Inventor:
Clinton L. Cummings,
by Abbott Spear
Attorney Nov. 8, 1955 — C. L. CUMMINGS — 2,722,845
CHANGE SPEED MECHANISM FOR INSTRUMENT DRIVES
Filed Nov. 12, 1953 — 2 Sheets-Sheet 2
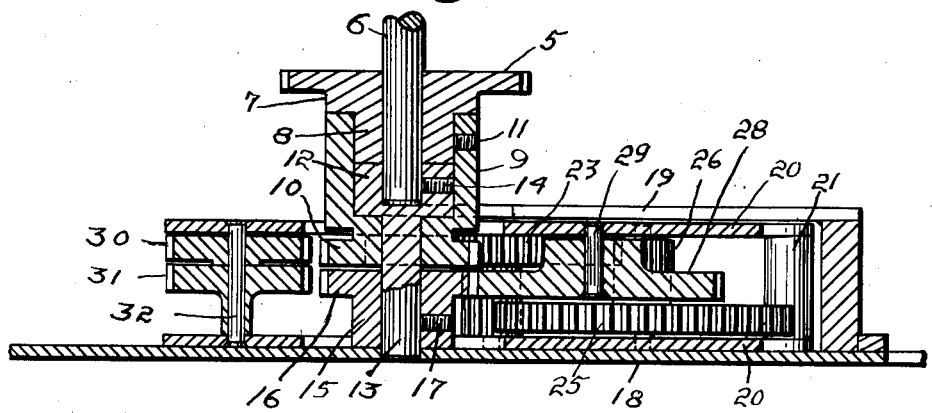
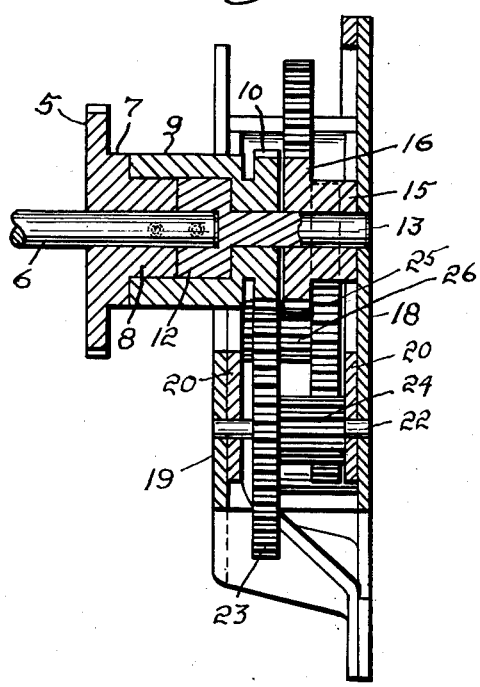
Inventor:
Clinton L. Cummings,
by Abbot Spear
Attorney

United States Patent Office 2,722,845
Patented Nov. 8, 1955

2,722,845

CHANGE SPEED MECHANISM FOR INSTRUMENT DRIVES

Clinton L. Cummings, Groton, Mass., assignor to Barry Controls Incorporated, Watertown, Mass., a corporation of Massachusetts Application November 12, 1953, Serial No. 391,570

5 Claims. (Cl. 74—354)

This invention relates to change speed devices for instrument drives.

While devices in accordance with the invention are adapted for other uses, they are particularly well suited for chart drives of recording instruments. In such drives, it is desired, as for purposes of paper economy, to provide a predetermined slow speed and a second faster rate of travel for use when more critical data is being recorded. Special problems are presented by such drives because of space limitations and the necessity for ease and reliability in effecting ratio changes. It is the principal objective of this invention to provide two speed ratio changers that are adapted to meet these and other requirements encountered in connection with recording instrument drives.

In accordance with the invention, the gears of the drive and driven members are co-axially disposed, usually with one of the members extending axially through the other. The device includes a pivotable yoke which straddles the member gears and is adapted to swing between first and second positions. The yoke rotatably supports the gears of a gear train of which one gear is positioned to mesh with one of the member gears in any position of the yoke and of which another gear is so disposed relative to one arm of the yoke as to mesh with the other member gear when the yoke is in its first position thus to connect the members at a first ratio. The other arm of the yoke rotatably supports a gear adapted to mesh, in the second position of the yoke, with the same member gear that completes the connection of the drive in the first position of the yoke. This gear is connected to the other member gear to provide a second ratio and preferably the second ratio is established by a pair of interconnected coaxial gears, one for each member gear.

In the accompanying drawings, there is shown an illustrative embodiment of the invention from which these and other of its objectives, novel features and advantages will be readily apparent.

In the drawings:

Fig. 1 is an elevational view of a ratio changer in accordance with the invention in its first operative position.

Fig. 2 is a like view of the ratio changer in its second position of use, and

Figs. 3 and 4 are sections taken along the indicated lines 3—3 and 4—4, respectively, of Fig. 1.

As illustrative of a chart drive of a recording instrument, there is shown a gear 5 and a shaft 6 which are to be connected at two different ratios.

In accordance with the invention, the gear 5 includes a hub 7 having a shouldered end 8 dimensioned to fit within the bore of the hub 9 which is part of the drive gear 10. The hub 9 is locked to the shouldered hub end 8 as by the set screw 11. The bore of the hub 9 is dimensioned to receive the bored head 12 of the shaft extension 13 with the head 12 being locked to the extremity of the shaft 6 as by the set screw 14. The shaft extension 13 extends axially through the drive gear 10 and to its exposed end the hub 15 of the driven gear 16 is locked by a set screw 17.

By this construction, concentric drive and driven members may be established in an existing chart drive with one of said members extending axially through the other. In the embodiment of the invention shown in the drawings, the exposed extremity of the shaft 13 is entrant of a bore in the outer wall 18 of a support adapted to be attached to the instrument. The support also has an inner wall 19.

A yoke, comprising a pair of approximately identical walls 20 interconnected as at 21, is supported between the walls 18 and 19 by a pivot 22 with its arms straddling the drive and driven gears and adapted to rock between first and second positions with respect thereto.

Rotatable on the pivot 22 is a gear 23 which is so located as to mesh with the drive gear 10 in any position of the yoke. Interconnected with the gear 23 is a gear 24 in mesh with the gear 25 which has axially connected thereto a gear 26. Gears 25 and 26 are rotatably supported as at 27 between the yoke walls 20 with the gear 26 meshing with the gear 28 rotatably supported as at 29. While the above detailed gear train may be varied to meet desired requirements, it will be noted that the gear 28 is so located with respect to one of the arms of the yoke that in the first position thereof, the gear 28 meshes with the driven shaft gear 16 to provide a desired ratio therebetween.

The other arms of the yoke have a pair of interconnected coaxial gears 30 and 31 rotatably supported as at 32 between the walls 20 and these gears are disposed to mesh with the drive and driven gears 10 and 16, respectively, when the yoke is in its second position thus to establish a desired second ratio therebetween. While the gears 30 and 31 are shown as approximately identical for purposes of illustration, it is preferred that the relation between the gears 31 and 16 be such as to ensure the initial meshing of the gears 10 and 30. This may be effectively accomplished as by relieving the teeth of the gear 31, the gear 16, or both, to the appropriate extent.

It will thus be appreciated that the invention makes possible ratio changers well adapted to meet all the requirements of production and use. It will be understood that the positions of the yoke may be effected in any desired way and it is shown as having an arm 33 as illustrative of means by which it may be actuated mechanically or electrically.

What I therefore claim and desire to secure by Letters Patent is:

1. In a change speed device for coaxial drive and driven gears, a pivotable yoke straddling said gears and adapted to swing between first and second positions, a gear train whose gears are rotatably supported by said yoke, one of the gears of said train meshing with one of said coaxial gears in any position of said yoke and another gear of said train being disposed relative to one arm of said yoke to engage with the other coaxial gear in the first position of the yoke and to be disengaged therefrom in the second position of said yoke, and a pair of interconnected coaxial gears, one for each coaxial gear, said interconnected pair of gears being carried by the other arm of said yoke to mesh with said coaxial gears when said yoke is in its second position.

2. In a change speed device for coaxial drive and driven gears, a pivotable yoke straddling said gears and adapted to swing between first and second positions, a gear train whose gears are rotatably supported by said yoke, one of the gears of said train meshing with one of said coaxial gears in any position of said yoke and having its axis concentric with that in which said yoke pivots and another gear of said train being disposed relative to one arm of said yoke to engage with the other coaxial gear in the first position of the yoke and to be disengaged therefrom in the second position of said yoke, and a pair of interconnected coaxial gears, one for each coaxial gear, said interconnected pair of gears being carried by the other arm of said yoke to mesh with said coaxial gears when said yoke is in its second position.

3. In a change speed device for coaxial drive and driven gears, a pivotable yoke straddling said coaxial gears and adapted to swing between first and second positions, a gear train whose gears are rotatably supported by said yoke, one of the gears of said train meshing with one of said coaxial gears in any position of said yoke and having its axis of rotation concentric with that on which said yoke pivots, and another gear of said train being disposed relative to one arm of said yoke to engage with the other coaxial gear in the first position of the yoke and to be disengaged therefrom in the second position of said yoke.

4. In a change speed device for coaxial drive and driven gears, a pivotable yoke straddling said gears and adapted to swing between first and second positions, a gear train whose gears are rotatably supported by said yoke, one of the gears of said train meshing with said drive gear in any position of said yoke and having its axis of rotation concentric with that on which said yoke pivots, and another gear of said train being disposed relative to one arm of said yoke to engage with the driven gear in the first position of the yoke and to be disengaged therefrom in the second position of said yoke, and a pair of interconnected coaxial gears rotatably carried by the other arm of said yoke to mesh with said drive and driven gears in the second position of said yoke, said driven gear and the one of said pair of interconnected coaxial gears that meshes therewith having their teeth proportioned to mesh after the other of said pair of coaxial interconnected gears is rotatably engaged by said drive gear.

5. In a change speed device for a gear having a hub and a shaft extending axially therethrough, a drive gear including a sleeve locked to said hub, a shaft extension extending axially through said drive gear and including a hub housed by said sleeve and locked to said shaft, and a driven gear locked to the exposed end of said shaft extension.

References Cited in the file of this patent

UNITED STATES PATENTS

| | | |
|---|---|---|
| 752,223 | Hisey | Feb. 16, 1904 |
| 1,981,428 | Schneider | Nov. 20, 1934 |
| 2,167,748 | Gebert | Aug. 1, 1939 |